United States Patent
Kato

(10) Patent No.: US 6,591,657 B1
(45) Date of Patent: Jul. 15, 2003

(54) METHOD OF MANUFACTURING BALL JOINT

(75) Inventor: Hiroshi Kato, Hamamatsu (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 0 days.

(21) Appl. No.: 09/979,803

(22) PCT Filed: Jun. 19, 2000

(86) PCT No.: PCT/JP00/03984

§ 371 (c)(1),
(2), (4) Date: Nov. 27, 2001

(87) PCT Pub. No.: WO01/75317

PCT Pub. Date: Oct. 11, 2001

(30) Foreign Application Priority Data

Mar. 30, 2000 (JP) ........................................ 2000-95719

(51) Int. Cl.[7] ............................................. B21D 41/04
(52) U.S. Cl. .................. 72/398; 72/370.17; 29/898; 470/26; 470/94
(58) Field of Search .............. 72/370.04, 401, 72/398, 396, 370.17, 402, 416; 470/25, 26, 94, 93, 204, 18, 24, 206, 208, 91; 29/898, 7

(56) References Cited

U.S. PATENT DOCUMENTS

| | | | | |
|---|---|---|---|---|
| 851,781 A | * | 4/1907 | Schweinert | 72/68 |
| 856,316 A | * | 6/1907 | Thurston | 403/118 |
| 2,441,580 A | * | 5/1948 | Mageoch | 470/25 |
| 2,701,733 A | * | 2/1955 | Frevik | 403/37 |
| 3,006,003 A | * | 10/1961 | Johnson | 470/25 |
| 3,503,246 A | * | 3/1970 | Shiokawa | 72/74 |
| 4,423,616 A | * | 1/1984 | Pease | 72/348 |
| 4,429,561 A | * | 2/1984 | Ramnesten | 72/478 |
| 5,429,014 A | * | 7/1995 | Laue | 74/586 |

FOREIGN PATENT DOCUMENTS

| | | | | |
|---|---|---|---|---|
| DE | 697557 | * | 9/1940 | 470/18 |
| EP | 0 336 357 A1 | | 10/1989 | |
| GB | 2220160 A | * | 1/1990 | 72/401 |
| JP | 57-165151 | * | 10/1982 | 72/398 |
| JP | 61-77417 | | 5/1986 | |
| JP | 1-306372 | | 12/1989 | |
| SU | 700268 | * | 12/1979 | 470/25 |

* cited by examiner

Primary Examiner—Daniel C. Crane
(74) Attorney, Agent, or Firm—Morrison & Foerster LLP

(57) ABSTRACT

An intermediate molding (41) is formed so that a cylindrical arm-to-be portion (42) projects from the cylindrical outer surface of a body portion (13) of the arm-to-be portion (42). The arm-to-be portion (42) has a given thickness and a hole (42a) with a diameter greater than the inner diameter of a projecting connector portion (20) of an arm portion (15). A pair of flat face portions (42b) extending parallel to the axis of the body portion (13) are formed on the cylindrical outer surface of the arm-to-be portion (42). A tap (44) that has an external thread (43) formed along its cylindrical outer surface is inserted into the hole (42a) of the arm-to-be portion (42). Concave faces (49),(49) are concaves respectively formed on the opposing surfaces of an upper die (47) and a lower die (48) so as to have a shape like a half cylinder with a curvature corresponding to that of the cylindrical outer surface of the projecting connector portion (20). The concave faces (49),(49) sandwich and apply pressure to the arm-to-be portion (42), thereby narrowing the arm-to-be portion (42) and forming an internal thread (19) in the cylindrical outer surface of the hole (42a) of the arm-to-be portion (42). With the tap (44) being removed while being rotated, formation of the arm portion (15) is completed. Compared with a method that calls for forming an internal thread (19) by threading with an external thread (43) of the tap (44), the method of the invention enables the easier and quicker formation. The invention also prevents wear of the tap (44) and enables the easy formation of the projecting connector portion (20) of the arm portion (15) having stable characteristics and a desired internal thread (19).

5 Claims, 4 Drawing Sheets

METHOD OF MANUFACTURING BALL JOINT

TECHNICAL FIELD

The present invention relates to a method of producing a ball joint and its housing, wherein an internal thread is formed in the inner surface of the arm portion of the ball joint.

BACKGROUND OF THE INVENTION

An example of conventional ball joints is shown in FIG. 7.

The conventional ball joint 51 shown in FIG. 7 has a housing 56, in which a generally spherical ball head portion 53 is enveloped, with a bearing seat (not shown) disposed between the spherical ball head portion 53 and the housing 56. The ball head portion 53 is provided at an end of a generally rod-shaped ball stud 52. The bearing seat is formed of synthetic resin. The housing 56 has a generally cylindrical body portion 55. The body portion 55 is provided at one end thereof with an opening from which a stud portion 54 of the ball stud 52 is projected. An arm portion 58 extends from the cylindrical outer surface of the body portion 55 of the housing 56 as an integral body with the body portion 55. By screwing an external thread (not shown) in the arm portion 58, another ball joint or the like can be coupled to the housing 56. The arm portion 58 has a generally cylindrical shape in which an internal thread 57 that permits an external thread to be screwed therein is formed. The production process of the arm portion 58 of the housing 56 calls for forming an intermediate molding including a cylindrical arm-to-be portion which has nearly the same dimension as that of the arm portion 58 and integrally projects from the cylindrical outer surface of the body portion 55 and forming the aforementioned internal thread 57 in the cylindrical inner surface of the arm-to-be portion of the intermediate molding by inserting a tap 61 into the arm-to-be portion while rotating said tap 61. Said tap 61 is provided with an external thread 60 formed along the cylindrical outer surface of the tap 61.

However, the structure shown in FIG. 7, wherein an internal thread 57 is formed by threading the arm-to-be portion of the intermediate molding with a tap 61 that has an external thread 60, enables the efficient processing, because it requires a considerably long machining time to perform reliable and stable formation of an internal thread 57 having a given pitch. Furthermore, great frictional force is generated between the tap 61 and the arm-to-be portion during threading, which frictional force wears the tap 61 and reduces its life span.

In order to solve the above problems, an object of the present invention is to provide a method of producing a ball joint and its housing, of which arm portion that has stable characteristics and is provided with an internal thread formed in its cylindrical inner surface can easily and quickly be formed.

DISCLOSURE OF THE INVENTION

The present invention provides a method of producing a ball joint housing which has an arm portion projected therefrom and is adapted to support a ball stud, said method calling for inserting a tap that has an external thread formed along its cylindrical outer surface into a hole formed in an intermediate molding, said hole having a cylindrical inner surface with a diameter greater than the diameter of said tap, and forming an internal thread in the cylindrical inner surface of said hole by narrowing said intermediate molding, in which the tap is inserted, by cold forging. Compared with a method that calls for forming an internal thread by threading with a tap having an external thread, the method of the invention enables the easier and quicker formation with an increased efficiency. As the invention also prevents wear or other damage to the tap, it is free from the problem of a damaged tap impairing formation of an internal thread having given dimensions, and therefore facilitates formation of the arm portion that has stable characteristics.

A method of producing a housing of a ball joint according to another feature of the present invention is characterized in that a pair of pressure dies respectively provided with concave faces, which are formed at locations opposite each other and are in the shape of a half cylinder corresponding to the half circle of the outer surface of the arm portion with a curvature corresponding to that of the cylindrical outer surface of the arm portion, function to narrow said intermediate molding by sandwiching the intermediate molding between said concave surfaces and, in this state, applying pressure to the intermediate molding. This feature enables the easy formation of an arm portion having stable characteristics without deviation of the center axis.

A method of producing a housing of a ball joint according to yet another feature of the present invention calls for forming, prior to narrowing the intermediate molding, a pair of flat faces cylindrical outer surface of the portion of the intermediate molding in which said hole is formed, said flat faces formed in such a manner as to diametrically oppose each other and extend either in parallel with or at an angle from, except perpendicularly, the directions in which the pressure is applied by said pressure dies. As a result, the method is effective in preventing formation of a burr or other similar defects, which would otherwise be formed on the cylindrical surface of the outer rim of the hole of the intermediate molding by flow of the surplus material in the course of narrowing process performed by the pressure dies. This feature thus eliminates the need of cutting work or other work to remove a burr and, consequently, prevent a change of the volume of the housing that would otherwise be caused by removal of a burr. Therefore, the invention ensures the easy and reliable formation of a housing having stable characteristics.

A method of producing a housing of a ball joint according to yet another feature of the present invention is characterized in that the intermediate molding is formed of an aluminum alloy. Because of this feature, the invention facilitates the narrowing of the intermediate molding in the state where the tap is inserted in the hole. Therefore, the invention is in improving the manufacturability of the housing by ensuring the easy formation of a housing, even if the housing will be used as a component that will have to bear a heavy load, such as a component of a vehicle.

A ball joint according to the present invention includes a housing formed by the method of producing a housing of a ball joint described above so as to have an opening and an inner chamber that directly communicates with the opening, a ball stud having a ball head portion and a stud portion positioned such that the ball head potion is contained in the inner chamber of the housing and that the stud portion is formed as a contiguous, integral body with the ball head portion and projected from said opening of the housing, and a bearing seat having an insertion hole and contained in the inner chamber of the housing so that the ball head portion of the ball stud is slidably enveloped in the bearing seat and that said stud portion projects from the insertion hole. As a result of using a housing that has efficiently and easily been formed with stable characteristics by the method of producing a housing of a ball joint described above, the manufacturability of the ball joint is improved.

PREFERRED EMBODIMENT OF THE INVENTION

Next, the structure of a ball joint according to an embodiment of the present invention is explained hereunder, referring to relevant drawings.

Figure 1:
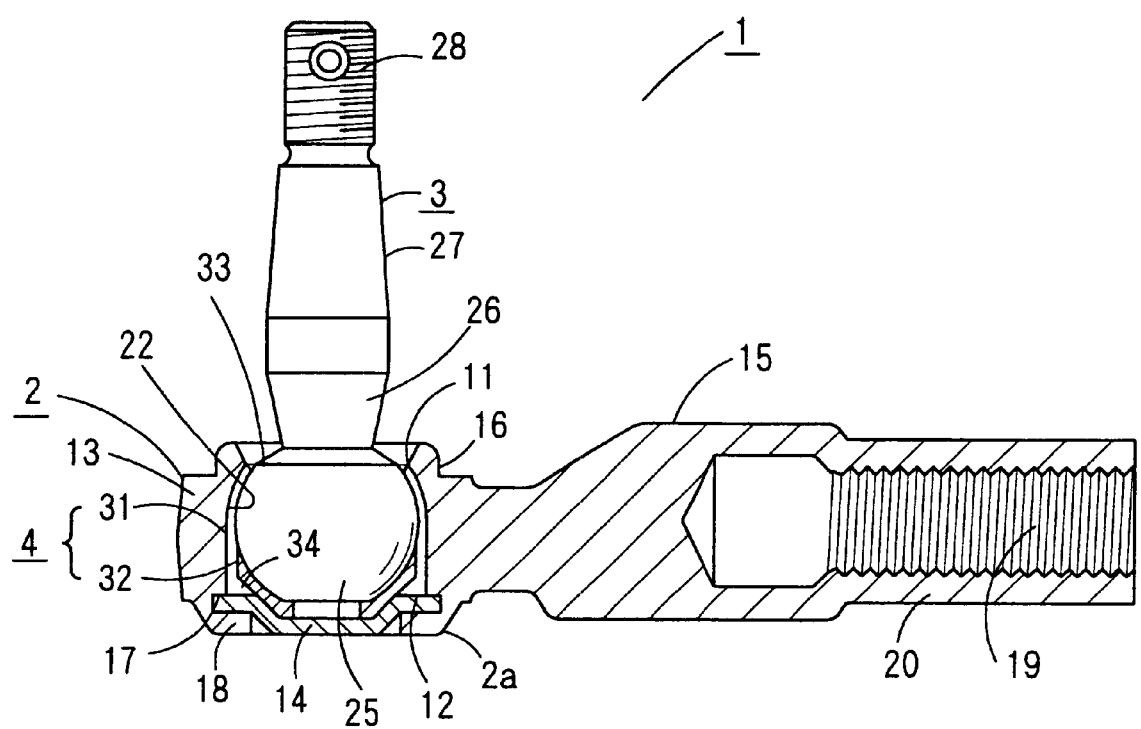
FIG. 1 is a partially cutaway side view of a ball joint according to an embodiment of the present invention.

Referring to FIG. 1, numeral 1 denotes a ball joint, which may be included in, for example, the steering mechanism or the suspension mechanism of an automobile or, provided at an end of a rack shaft of a rack-and-pinion steering system.

The ball joint 1 comprises a housing 2 having a generally cylindrical shape with a bottom, a metal ball stud 3, a bearing seat 4 formed of synthetic resin, and a dust cover (not shown) which is formed of rubber or a soft synthetic resin into a generally cylindrical shape. The housing 2 is formed of an aluminum alloy, such as A6061 (Japan Industrial Standard: JIS-H-4000), which is an alloy of aluminum, magnesium and silicon.

The housing 2 includes a socket portion 2a formed in a cylindrical shape with a bottom. The socket portion 2a has a body portion 13, and a disk-shaped bottom face portion 14. The body portion 13 is open at both ends, i.e. an opening 11 at one end and an insertion hole 12 at the other end. The bottom face portion 14 is integrally attached to the body portion 13 in such a manner as to close off the insertion hole 12. The housing 2 also includes a cylindrical arm portion 15 that radially projects from the cylindrical outer surface of the body portion 13 as an integral body with the body portion 13.

The body portion 13 has a cylindrical cover attaching portion 16 which has a diameter smaller than the body portion 13 and is coaxially formed along the rim of the opening 11 as an integral body with the body portion 13. A contact portion 17 is formed in the cylindrical inner surface of the body portion 13, at a location close to the insertion hole 12, so that that part of the body portion 13 is indented like a step with its inner diameter increased to nearly the same as the outer diameter of the bottom face portion 14. A stopper portion 18 adapted to catch the rim of the bottom face portion 14 so as to hold it and prevent its unintentional displacement is formed along the rim of the insertion hole 12 of the body portion 13.

The arm portion 15 is integrally provided at its end with a projecting connector portion 20, which is formed in a cylindrical shape having a diameter smaller than the arm portion 15 and extends coaxially therewith. An internal thread 19 is formed in the cylindrical inner surface of the projecting connector portion 20.

The bottom face portion 14 is inserted into the body portion 13 from the insertion hole 12 of the body portion 13 until the rim of the bottom face portion 14 comes into contact with the contact portion 17, and the stopper portion 18 is crimped inward. Thus, the housing 2 having a generally cylindrical shape with a bottom is assembled. The interior of the housing 2 assembled as above serves as an inner chamber 22.

The ball stud 3 is comprised of a spherical ball head portion 25, a stud portion 27 and a small diameter portion 26, all of which are formed in an integral, contiguous body with the small diameter portion 26 located between the ball head portion 25 and the stud portion 27. An external threaded portion 28 is formed at the end of the stud portion 27.

The bearing seat 4 has a cylindrical portion 31 and a bottom portion 32. The cylindrical portion 31 is formed of a synthetic resin, such as polyacetal resin or polyurethane resin, that has good bearing characteristics and a great ability to withstand load, as well as sufficient rigidity and elasticity. The bottom portion 32 is formed of the same material as the cylindrical portion 31 into a ring shape and adapted to catch the lower axial end of the cylindrical portion 31. An insertion hole 33 adapted to permit the ball head portion 25 of the ball stud 3 to be inserted therefrom into the bearing seat so that the stud portion 27 projects from the insertion hole 33 is formed at one of the axial ends, i.e. the upper end, of the cylindrical body portion 32. A seating portion 34, which is in a flange-like shape rising inward, is formed around the inner rim of the other end of the cylindrical portion 31, i.e. the lower end, so that the bottom portion 32 is permitted to abut and rest on the seating portion 34. The bottom portion 32 is formed in an annular shape so that the curved inner surface of the bottom portion 32 envelopes a part of the ball head portion 25 of the ball stud 3, with the outer rim part of the bottom portion 32 overlapping the seating portion 34 of the cylindrical portion 31 and the inner rim part of the bottom portion 32 resting on the bottom face portion 14 of the housing 2.

The bearing seat 4 is formed by assembling the cylindrical portion 31 and the bottom portion 32 into a generally cylindrical shape with a bottom. The bearing seat 4 is then placed in the inner chamber 22 of the housing 2 in the state where the ball head portion 25 is enveloped in the bearing seat 4. In this state, the center of the ball head portion 25 is located at some point along the center axis of the arm portion. The dust cover is provided at one end thereof with a first fitting portion (not shown), which has a ring-like shape and is adapted to fit to the cover attaching portion 16 of the housing 2. At the other end thereof, the dust cover is provided with a second fitting portion which has a ring-like shape and is adapted to fit to the stud portion 27 of the ball stud 3.

Although not shown in the drawings, a rack-end ball joint having an external thread formed along its outer surface or other similar member is screwed in the projecting connector portion 20 of the arm portion 15 of the housing 2 of the ball joint 1.

Next, the process of producing the housing of the ball joint of the embodiment described above is explained hereunder, referring to the relevant drawings.

Figure 2:
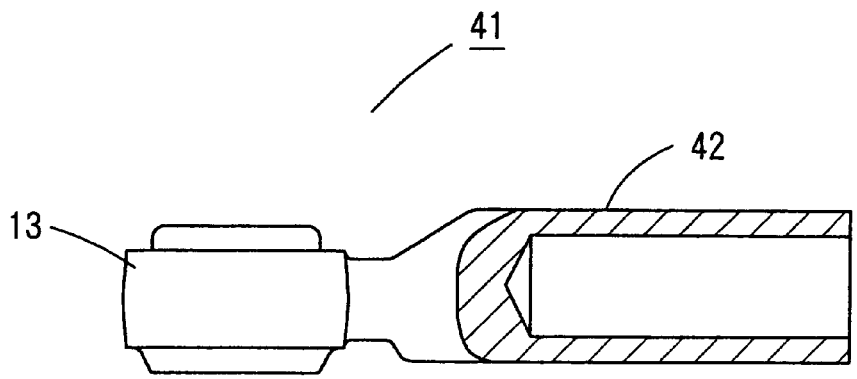
FIG. 2 is a partially cutaway side view of an intermediate molding used for producing said ball joint.
Figure 3:
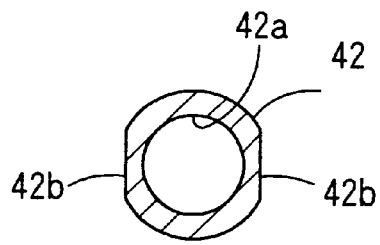
FIG. 3 is a side view of an arm-to-be portion of said intermediate molding used for producing the ball joint.

First of all, by extrusion, pressing, forging, casting or any other appropriate processing, an intermediate molding 41 shown in FIGS. 2 and 3 is formed from a material (not shown) made of an aluminum alloy, such as A6061 (JIS-H-4000), which is an alloy of aluminum, magnesium and silicon.

The intermediate molding 41 has a generally cylindrical arm-to-be portion 42 projecting from the cylindrical outer surface of the body portion 13, which has an opening 11 at one end and an insertion hole 12 at the other end. The arm-to-be portion 42 is formed in a generally cylindrical shape with a given thickness and has a hole 42a with a diameter greater than the inner diameter of the projecting connector portion 20 of the arm portion 15. The arm-to-be portion 42 projects from a given location of the body portion 13 in an integral body therewith in such a manner that the axis of the arm-to-be portion 42 extends approximately parallel to the radius of the body portion 13. A pair of flat face portions 42b respectively having flat faces that diametrically oppose each other and extend parallel to the axis of the body portion 13 are formed on the cylindrical outer surface of the body portion 13.

The bottom face portion 14 is integrally attached to the body portion 13 in such a manner as to close off the insertion hole 12. The housing 2 also includes a cylindrical arm portion 15 that radially projects from the cylindrical outer surface of the body portion 13 as an integral body with the body portion 13.

Figure 4:
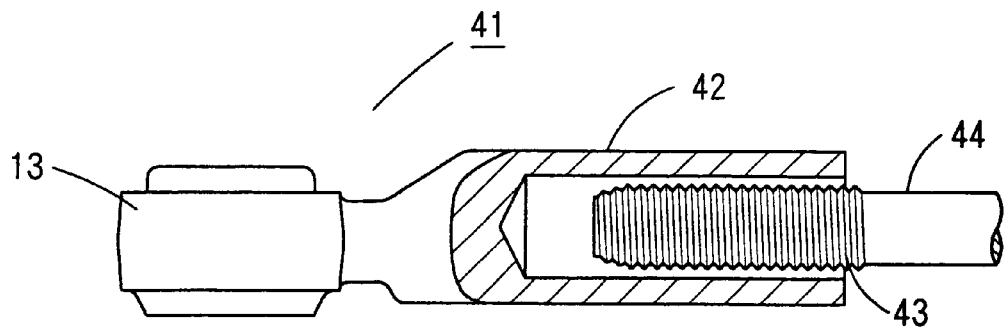
FIG. 4 is a schematic illustration to explain how a tap is inserted in the arm-to-be portion in the process of cold forging of the intermediate molding for producing said ball joint.

As shown in FIG. 4, a tap 44 that has an external thread 43 formed along its cylindrical outer surface is inserted into the hole 42a, which defines the cylindrical inner surface of the arm-to-be portion 42 of the intermediate molding 41. The external thread 43 of the tap 44 has the same pitch as that of the external thread of the rack-end ball joint of the tie rod or other similar member to be connected to the ball joint 1.

Figure 5:
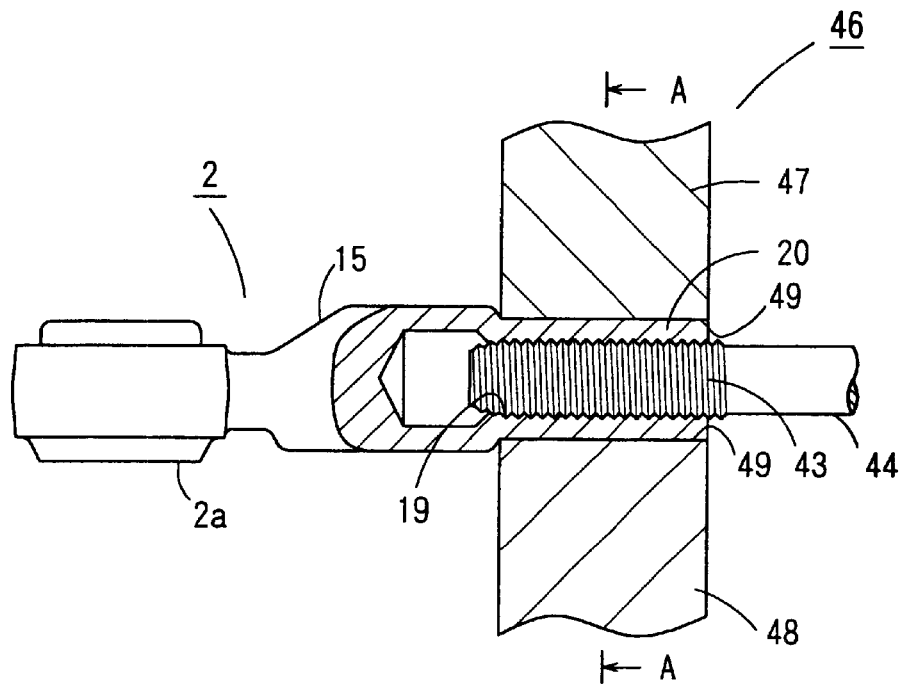
FIG. 5 is a schematic illustration to explain how the arm-to-be portion is narrowed in the process of cold forging of the intermediate molding for producing said ball joint.
Figure 6:
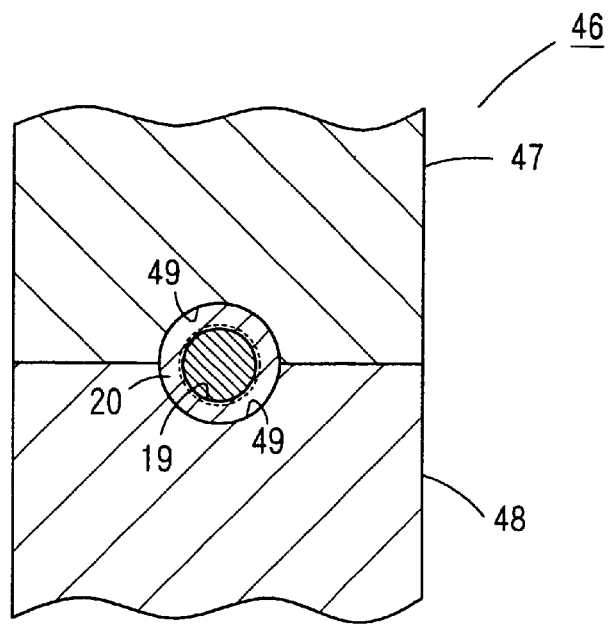
FIG. 6 is a sectional view taken along the line A—A of FIG. 4.
Figure 7:
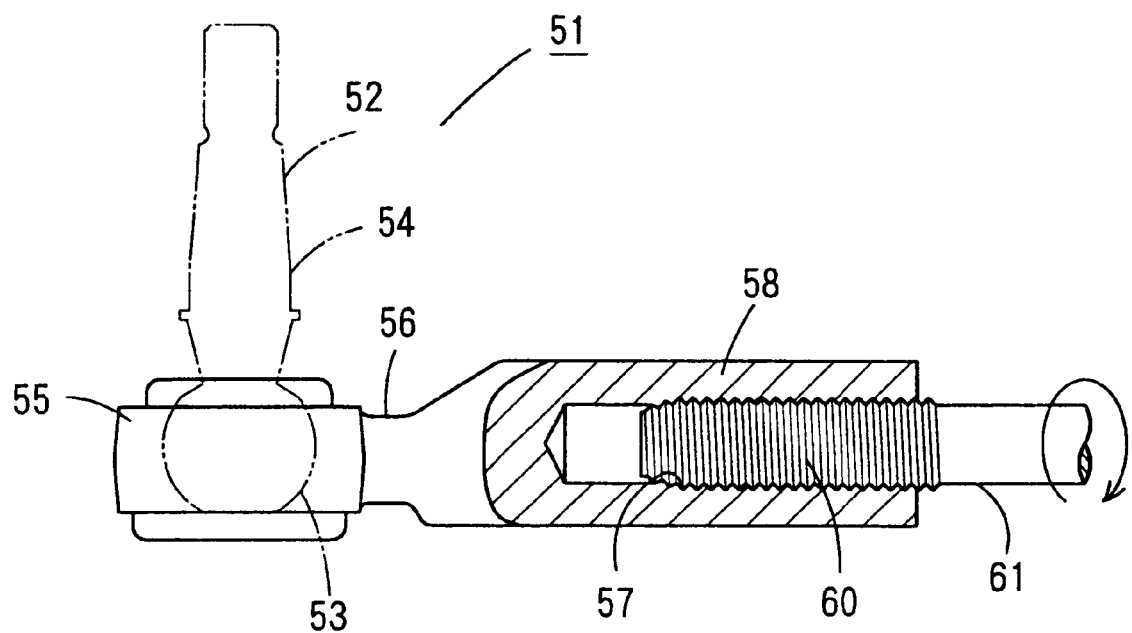
FIG. 7 is a schematic illustration to explain how a housing of a conventional ball joint is formed.

Thereafter, the arm-to-be portion 42 is set in a pressing machine 46 in the state where the tap 44 is in the hole 42a of the arm-to-be portion 42. As shown in FIGS. 5 and 6, the pressing machine 46 has a pair of pressure dies, i.e. an upper die 47 and a lower die 48. The opposing surfaces of the upper die 47 and the lower die 48 are respectively provided with concave faces 49,49. Each concave face 49 is formed in a concave surface in the shape of a half cylinder approximately corresponding to the half circle of the outer surface of the arm portion 15, with a curvature corresponding to that of the cylindrical outer surface of the projecting connector portion 20 of the arm portion 15. When the upper die 47 and the lower die 48 are brought into contact with each other, the concave faces 49,49 together define a cylindrical shape having a diameter equal to the outer diameter of the projecting connector portion 20 of the arm portion 15.

The arm-to-be portion 42, in which the tap 44 is inserted, is positioned between the two opposing concave faces 49,49 of the upper and lower dies 47,48 of the pressing machine 46. Thereafter, by moving the upper and lower dies 47,48 towards each other, in other words approximately along the flat face portions 42b, pressure is applied to the arm-to-be portion 42 in such a direction as to flatten the arm-to-be portion 42, which is sandwiched between the upper die 47 and the lower die 48, so that the diameter of the arm-to-be portion 42 is reduced with the surplus material being forced to move towards the flat face portions 42b. As a result of the reduction of the diameter of the arm-to-be portion 42, the external thread 43 of the tap 44 digs into the cylindrical inner surface of the arm-to-be portion 42 so that an internal thread 19 having a pitch corresponding to the external thread 43 is formed in the cylindrical inner surface of the hole 42a of the arm-to-be portion 42. Thus, an arm portion 15 provided with a projecting connector portion 20 that has given outer and inner diameters and a given thickness is formed. Thereafter, with the tap 44 being pulled out from the arm-to-be portion 42 while being rotated, formation of a housing 2 that includes an arm portion 15 having a projecting connector portion 20 is completed.

According to the embodiment described above, an arm portion 15 having a projecting.connector portion 20 is formed by following a procedure comprising inserting the tap 44, which has an external thread 43 formed along its cylindrical outer surface, into the hole 42a of the cylindrical arm-to-be portion 42 of the intermediate molding 41, which arm-to-be portion 42 integrally projects from the cylindrical outer surface of the body portion 13 and has an inner diameter greater than the inner diameter of the projecting connector portion 20 of the arm portion 15, and, thereafter, reducing the diameter of the arm-to-be portion 42 by cold forging so as to form an internal thread 19 in the cylindrical inner surface of the hole 42a. Therefore, by press working, which is a kind of cold forging, the process according to the embodiment of the invention enables the easy and quick formation of an arm portion 15, thereby increasing the forming efficiency, compared with such a conventional method that calls for forming an internal thread 19 by using a tap 44 having an external thread 43 to thread the cylindrical inner surface of an arm-to-be portion 42, which has been so formed beforehand as to have the same dimensions as the arm portion 15. Another benefit of the embodiment described above lies in that it prevents wear or other damage to the tap 44; it is free from the problem of a worn tap 44 impairing formation of an internal thread 19 having a given depth and is therefore effective in increasing the yield of the housing 2. Furthermore, by the increased life span of the tap 44, the embodiment enables the easy and efficient production of the arm portion 15 having stable characteristics. These benefits are consequently effective in improving the manufacturability and reducing the production cost of a ball joint 1 that uses a housing 2 easily and efficiently formed with stable characteristics by the production method according to the embodiment described above.

By using a pressing machine 46 having a pair of dies, i.e. an upper die 47 and a lower die 48, respectively having concave faces 49,49 that oppose each other, the narrowing of the arm-to-be portion 42 is performed in such a manner that the arm-to-be portion 42 is sandwiched by the concave faces 49,49, each of which is in the shape of a half cylinder approximately corresponding to the half circle of the outer surface of the arm portion 15 and having a curvature corresponding to that of the cylindrical outer surface of the projecting connector portion 20 of the arm portion 15, and that pressure is applied to the arm-to-be portion 42 in such a direction as to flatten the arm-to-be portion 42. According to the method described above, the center axis of the arm-to-be portion 42 does not deviate from the center axis of the projecting connector portion 20 of the arm portion 15. Therefore, the method enables the easy formation of an arm portion 15 that is provided with a projecting connector portion 20 having stable characteristics with the minimal possibility of deviation of the center axis.

Furthermore, the arm-to-be portion 42 of the intermediate molding 41 has flat face portions 42b,42b diametrically opposing each other. The pair of dies, i.e. the upper die 47 and the lower die 48 which face toward each other, reduce the diameter of the arm-to-be portion 42 by sandwiching the arm-to-be portion 42 and applying pressure thereto in the direction in which the flat faces of the flat face portions 42b,42b extend. As a result, the surplus material is forced to move into the space defined by each flat face portion 42b and the corresponding parts of the concave faces 49,49 of the upper and lower dies 47,48. Therefore, the method of the embodiment is effective in preventing formation of a burr that might otherwise be caused by the surplus material flowing into the gap between the upper and lower dies 47,48 and impair uniform application of a given pressure and consequently inhibit the arm portion 15 from having given, appropriate dimensions. The embodiment thus enables the easy and reliable formation of a housing 2 that includes an arm portion 15 having stable characteristics without requiring complicated cutting work for removing a burr.

The material used by the present embodiment is an aluminum alloy, such as A6061 (JIS-H-4000), which is an alloy of aluminum, magnesium and silicon. Because of this feature, the embodiment improves the manufacturability of the housing by enabling the easy formation of a housing 2 that includes an arm portion 15 having an internal thread 19 and is ensured of stable characteristics for a long period of time without fluctuation of the characteristics, even if the housing 2 is a part of a ball joint 1 used in a vehicle or as any other component that will have to bear a heavy load. Yet another benefit of the embodiment lies in that the internal thread 19 can easily be formed, because an aluminum alloy is a soft alloy.

The usage of the embodiment described above is not limited to the steering mechanism or the suspension mechanism of an automobile; the embodiment is applicable to any kind of ball joint, including those provided with no dust covers or having bearing seats in other shapes.

The invention is explained as above referring to the embodiment, wherein an arm portion 15 that is provided at its end with a projecting connector portion 20 having an internal thread 19 is formed by pressing a part of the arm-to-be portion 42 so as to narrow that part. However, it is also possible to form the entire arm portion 15 into a projecting connector portion 20 having a uniform outer diameter by pressing nearly the entire cylindrical part of the arm-to-be portion 42.

Furthermore, the method of narrowing process is not limited to press working, and any method (for example, rolling a roller along the cylindrical outer surface of the arm-to-be portion 42) may be employed, as long as narrowing of the arm-to-be portion 42 is performed in the state where a tap 44 is inserted in an arm-to-be portion 42. There is the possibility of the axial dimension of the arm-to-be portion 42 becoming excessively long due to flow of the surplus material during the narrowing of the arm-to-be portion 42. Depending on the manner of narrowing process, however, such a problem can be solved by setting the length of the arm-to-be portion 42 beforehand so that the arm portion has a given length when its formation is completed. Thus setting the length of the arm-to-be portion 42 eliminates the necessity of cutting or other post-formation processing of the end of the arm-to-be portion 42, and consequently improves the efficiency in formation.

According to the embodiment described above, the pressing machine 46 has a pair of dies, i.e. an upper die 47 and a lower die 48, and performs narrowing of the arm-to-be portion 42 by sandwiching it between the upper die 47 and the lower die 48. However, the pressing machine 46 may have any other appropriate structure, examples of which include one having a split mold divided into a plurality of radially arranged dies that can be moved either actively, or in relation to moving the arm-to-be portion 42, in the direction of the center of the split mold so as to reduce the inner diameter of the split mold.

Furthermore, although the above explanation involves a structure provided with a single arm portion 15, the explanation is also applicable to any other structures having a plurality of arm portions.

It is possible to perform narrowing of the arm-to-be portion 42 of the intermediate molding 41 after the ball stud 3 or the like is attached to the body portion 13 of the intermediate molding 41.

The ball stud 3 does not always have to be positioned such that the center of the ball head portion 25 of the ball stud 3 contained in the housing 2 is located at some point along the center axis of the arm portion 15; for example, the center axis of the arm portion 15 may be positioned at a slight distance from the center of the ball head portion 25 of the ball stud 3, or the arm portion 15 may project from the cylindrical surface of the body portion 13 at an angle therefrom. However, positioning the ball stud 3 such that the center of the ball head portion 25 of the ball stud 3 contained in the housing 2 is located on the center axis of the arm portion 15 in the same manner as the embodiment described above is effective in increasing the buckling strength of the ball joint 1 with respect to load applied to the ball joint.

Although the intermediate molding 41 is formed of an aluminum alloy, such as A6061 (JIS-H-4000), which is an alloy of aluminum, magnesium and silicon, according to the embodiment, any material may be used provided that its shape can be changed so as to be narrowed and permit an internal thread 19 to be formed in its inner surface. Although explanation has been given referring to the arm-to-be portion 42 having flat face portions 42b,42b, it is also possible to form the flat face portions 42b,42b by press working or cutting work after formation of an intermediate molding 41 that has a cylindrical arm-to-be portion 42. However, it is not essential to provide flat face portions 42b,42b.

POSSIBLE INDUSTRIAL APPLICATION

As described above, a ball joint according to the present invention is typically used in the state where it is attached to an end of the rack bar of the rack-and-pinion steering system, the steering mechanism or the suspension mechanism of an automobile.

What is claimed is:

1. A method of producing a housing of a ball joint, the housing including an arm portion projecting therefrom and being adapted to support a ball stud, the method comprising:

inserting a tap that has an external thread formed along a cylindrical outer surface thereof into a hole formed in an intermediate molding, the hole comprising a cylindrical inner surface having a diameter greater than a diameter of the tap, and forming an internal thread in the cylindrical inner surface by narrowing the diameter of the cylindrical inner surface of the hole containing the tap therein by cold forging, wherein the forming of the internal thread comprises providing a pair of pressure dies respectively having concave faces, formed at locations facing each other when the pressure dies are combined for the cold forging and each having a shape of a half cylinder corresponding to a half of a cylindrical outer surface of the arm portion that is split along the longitudinal central axis of the arm portion, the curvature of the concave faces being substantially equal to the curvature of the cylindrical outer surface of the arm portion, placing the intermediate molding between the concave faces and applying a pressure to the intermediate molding through the pressure dies containing the intermediate molding therein.

2. The method of producing a housing of a ball joint of claim 1, wherein further comprising, prior to the forming of the internal thread, forming a pair of flat faces on a cylindrical outer surface of the intermediate molding at locations corresponding to the application of the pressure, the flat faces being diametrically opposite from each other and extending either in parallel with or at an angle from, except a right angle, the direction in which the pressure is applied to the intermediate molding by the pressure dies.

3. The method of producing a housing of a ball joint of claims 1 or 2, wherein the intermediate molding is made of an aluminum alloy.

4. A method of producing a housing of a ball joint, the housing including an arm portion projecting therefrom, the method comprising:

providing a cylindrical intermediate molding that has a cylindrical internal hole therein;

removing a first portion of the cylindrical intermediate molding along the cylindrical internal hole;

inserting a tap that has an external thread formed along a cylindrical outer surface thereof into the cylindrical internal hole, the diameter of the cylindrical internal hole being greater than the diameter of the tap; and applying a pressure to a portion of the intermediate molding that includes the portion from which the first portion is removed so that the external thread of the tap is impressed on a surface of the internal cylindrical hole of the intermediate molding.

5. The method of producing a housing of a ball joint of claim 4, further comprising removing a second portion of the cylindrical intermediate molding along the cylindrical internal hole prior to the application of the pressure, wherein the first and second portions are located opposite from each other with respect to the central axis of the cylindrical internal hole.

* * * * *